United States Patent
Meyer et al.

(10) Patent No.: US 6,682,231 B2
(45) Date of Patent: Jan. 27, 2004

(54) OPTICAL SUBASSEMBLY AND RELATED METHODS FOR ALIGNING AN OPTICAL FIBER WITH A LIGHT EMITTING DEVICE

(75) Inventors: Stephan Meyer, San Francisco, CA (US); Andreas H. Dannenberg, Cupertino, CA (US); Stefan J. Burmeister, San Francisco, CA (US); David R. Dodds, Boulder, CO (US)

(73) Assignee: Infineon Technologies North America Corp., San Jose, CA (US)

( * ) Notice: Subject to any disclaimer, the term of this patent is extended or adjusted under 35 U.S.C. 154(b) by 85 days.

(21) Appl. No.: 09/738,737

(22) Filed: Dec. 14, 2000

(65) Prior Publication Data

US 2002/0076172 A1 Jun. 20, 2002

(51) Int. Cl.$^7$ ................................. G02B 6/36
(52) U.S. Cl. ....................... 385/91; 385/88; 385/89; 385/90
(58) Field of Search ................. 385/91, 90, 89, 385/88, 92

(56) References Cited

U.S. PATENT DOCUMENTS 5,661,835 A * 8/1997 Kato et al. ..................... 385/33
5,993,070 A * 11/1999 Tamekuni et al. .......... 385/137

OTHER PUBLICATIONS

"Hi Feber", Appliance Manufacture Magazine, Apr. 2000.

"VF–45 Duplex Fiber Optic Interconnect", 3M, No date.

* cited by examiner

Primary Examiner—Rodney Bovernick
Assistant Examiner—Sung Pak
(74) Attorney, Agent, or Firm—Fish & Richardson P.C.

(57) ABSTRACT

An optical subassembly for aligning an optical fiber with a light emitting device includes a fiber optic stub mounted in a ferrule and a v-groove device coupled to the ferule with a loose end of the fiber optic stub lying in the v-groove device. The other end of the fiber optic stub is polished. According to methods contemplated by the invention, the ferrule is mounted in a ring which is welded to a light emitting subassembly. The unpolished loose end of the fiber optic stub self-aligns with a mating fiber in the v-groove device. According to the presently preferred embodiment, the v-groove device is provided with s-bends which aid in self-alignment between the loose fibers.

2 Claims, 2 Drawing Sheets

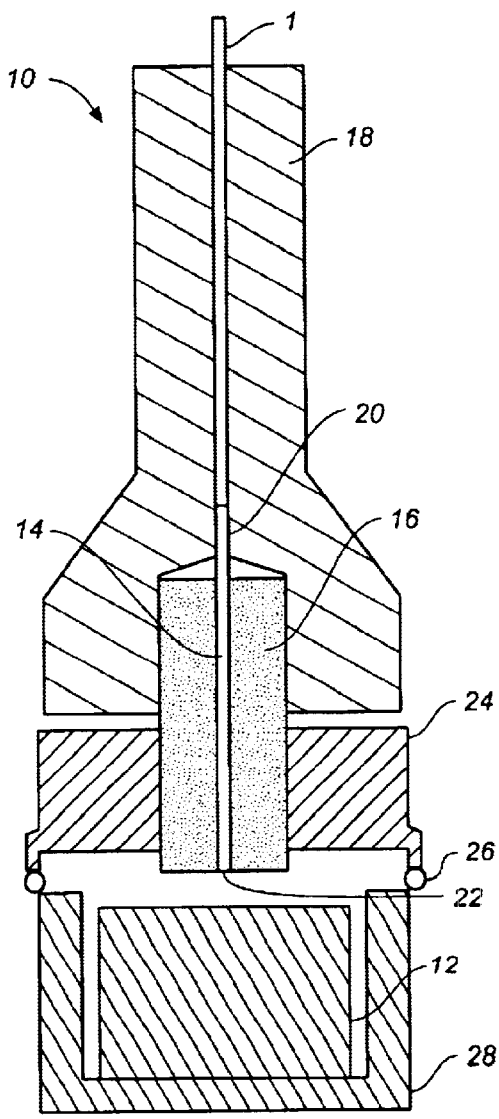
FIG._1
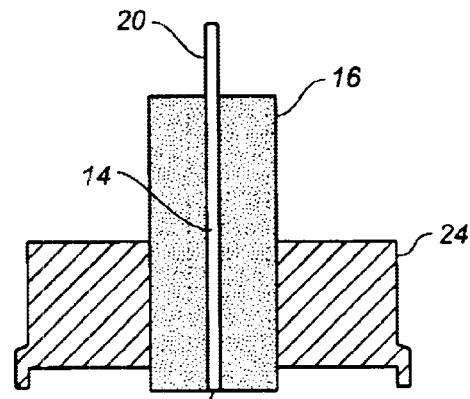
FIG._3
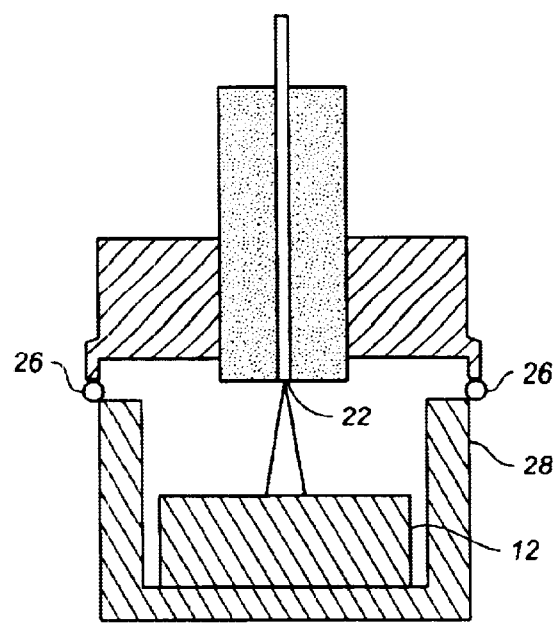
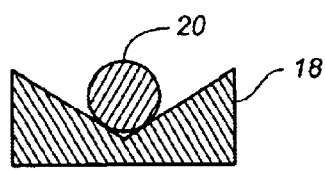
FIG._2
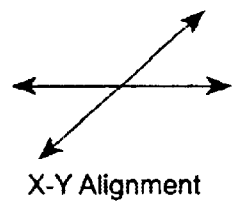
X-Y Alignment
FIG._4

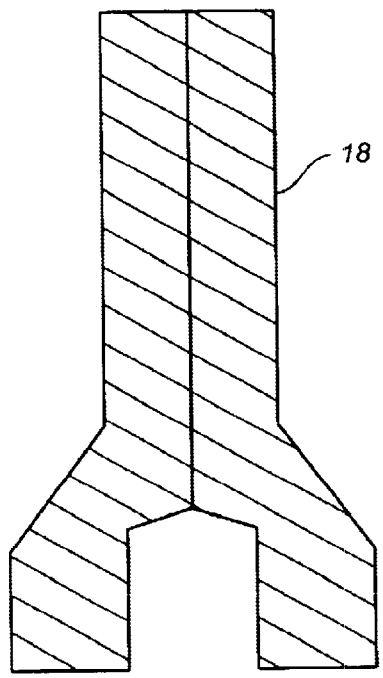
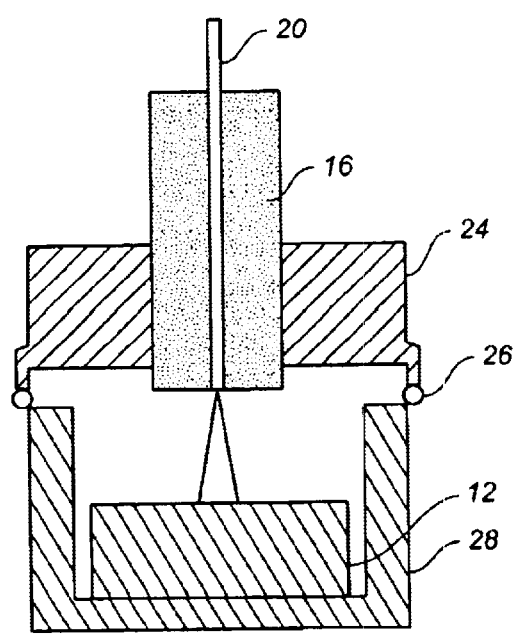
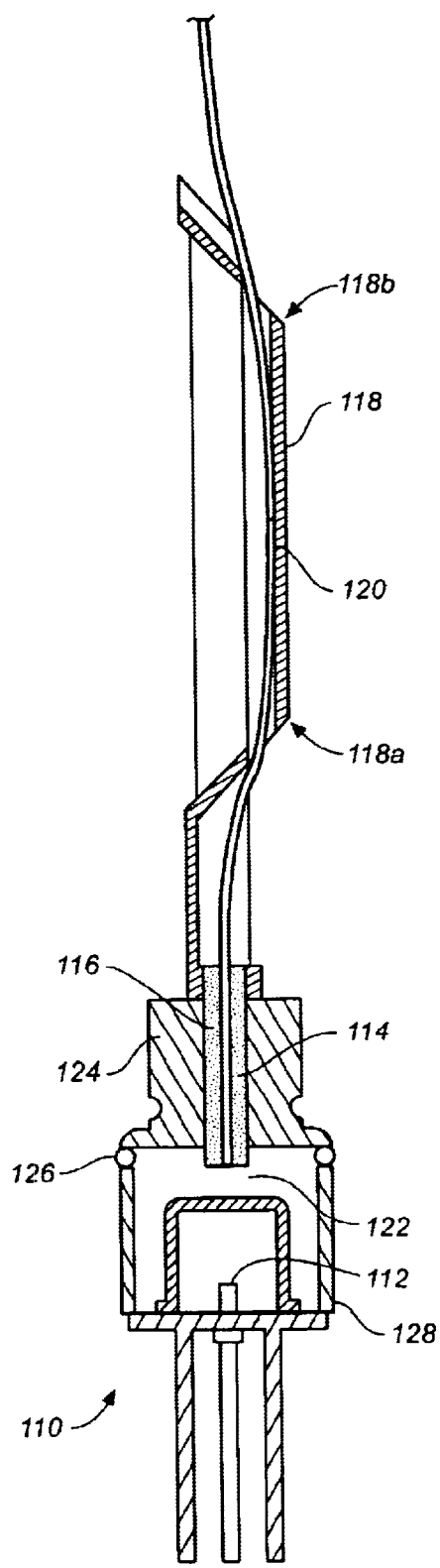
FIG._5  FIG._6

OPTICAL SUBASSEMBLY AND RELATED METHODS FOR ALIGNING AN OPTICAL FIBER WITH A LIGHT EMITTING DEVICE

BACKGROUND OF THE INVENTION

1. Field of the Invention

The invention relates to fiber optics. More particularly, the invention relates to an optical subassembly and related methods for aligning an optical fiber with a light emitting device.

2. Brief Description of the Prior Art

One of the most critical components in any fiber optic system is the interface between electrical and optical components. In high bandwidth telecommunications applications, for example, it is critical that an accurate transition be made between the optical and electrical components. One of the single most important development in bringing fiber optic telecommunications to the home and office is the emergence of a new generation of small form factor fiber connectors.

When fiber was first being laid in long distance networks, fibers had to be spliced together using special splicing kits applied by skilled personnel. The advent of standardized ST and SC fiber connectors reduced the cost of fiberization, encouraging the use of fiber. But it was not enough to make fiber-to-home and fiber-to-desk schemes cost effective except in the few cases where fiber rather than copper was effectively mandated by exceptionally high bandwidth, security, or interference requirements.

The new breed of small form factor (SFF) connectors are about the same size as the RJ45 connectors used for twisted pair telephone systems and LANs. This compares with a more traditional fiber optic connector, which is about twice the size of an RJ45. SFF connectors have a lower unit cost than traditional connectors and they are built for easy, "snap-in" installation. SFF connectors therefore reduce the cost of fiber-to-the-x, both directly and through reducing the cost of installation.

Since the introduction of fiber optic connectors in the 1970s, there have been many different methods of retaining the fiber in the precise alignment necessary to insure minimum light loss and to minimize reflections between joined sections of cable. One prior art method utilizes lenses and another utilizes a ceramic sleeve to align with a ferrule carrying a fiber polished on both ends. Both of these methods have drawbacks. The lensing system required extremely precise alignment to achieve sufficient transmission accuracy. The ceramic sleeve approach provides much higher accuracy but is much more expensive to produce.

SUMMARY OF THE INVENTION

It is therefore an object of the invention to provide an optical subassembly and related methods for aligning an optical fiber with a light emitting device.

It is also an object of the invention to provide an optical subassembly and related methods for aligning an optical fiber with a light emitting device which can be fabricated utilizing an automated assembly process.

It is another object of the invention to provide an optical subassembly and related methods for aligning an optical fiber with a light emitting device which can be built with standard laser welding machines.

It is still another object of the invention to provide an optical subassembly and related methods for aligning an optical fiber with a light emitting device which inexpensive to manufacture.

In accord with these objects which will be discussed in detail hereinafter, one embodiment of the invention contemplates apparatus for coupling a light emitting device to the mating fiber of a connector comprising a ferrule; and a fiber stub mounted in the ferrule. The fiber stub, according to the invention, has a fixed end substantially flush with the surface of the ferrule and a loose end extending beyond the surface of the ferrule.

According to another embodiment of the invention, a ferrule and fiber stub mounted in the ferrule (again, the fiber stub having a fixed end substantially flush with the surface of the ferrule and a loose end extending beyond the surface of the ferrule), are combined with a light emitting device (held by first mounting means for holding the light emitting device), using a second mounting means (for holding the ferrule with the fiber stub mounted therein) adapted to be welded to the first mounting means.

A further aspect of the invention is directed to an optical subassembly for aligning an optical fiber with a light emitting device of including a fiber optic stub mounted in a ferrule used with a v-groove device. The v-groove device receives a loose end of the fiber optic stub, for alignment of the loose end with a mating fiber of a connector also placed in the v-groove device. The other end of the fiber optic stub is polished.

According to a this embodiment of the invention, the ferrule is mounted in a ring which is welded to a light emitting subassembly. The invention contemplates self aligning the unpolished loose end of the fiber optic stub with the mating fiber in the v-groove device.

According to the presently preferred embodiment, the v-groove device is provided with one or more s-bends which aid in self-alignment between the loose fibers.

Still further, the invention contemplates a method for coupling a light emitting device to the mating fiber of a connector, comprising the steps of (a) mounting a fiber stub in a ferrule such that a first end of the fiber stub is mounted substantially flush with a first surface of the ferrule and a second end of the fiber stub extends beyond a second surface of the ferrule; (b) utilizing a mounting ring to hold the ferrule and fiber stub mounted therein; and (c) aligning the mounting ring containing the ferrule and the fiber stub with a light beam emitted from a light emitting device so that the first end of the fiber stub and the light beam are brought into substantial alignment.

According to a presently preferred embodiment of the invention, the aforestated method further comprises the step of polishing the first end of the fiber stub.

Further methods contemplated by the invention include fixing the position of the mounting ring containing the ferrule and the fiber stub, relative to the light beam emitted from the light emitting device once the first end of the fiber stub and the light beam are brought into substantial alignment; and self aligning the second end of the fiber stub extending beyond the second surface of the ferrule, with the mating fiber of a connector utilizing a v-groove device.

According to a presently preferred embodiment of the invention, the aforestated methods further comprise the steps of welding the mounting ring to means for holding the light emitting device; utilizing a v-groove containing at least one s-bend; and performing the assembly process contemplated by the invention automatically.

Additional objects and advantages of the invention will become apparent to those skilled in the art upon reference to the detailed description taken in conjunction with the provided figures.

BRIEF DESCRIPTION OF THE DRAWINGS

FIG. 1 is a schematic view of an optical subassembly for aligning an optical fiber with a light emitting device according to the invention showing the device coupled to a mating fiber;

FIG. 2 is a schematic end view of the v-groove device of the optical subassembly for aligning an optical fiber with a light emitting device according to the invention;

FIG. 3 is a schematic view of an optical subassembly for aligning an optical fiber with a light emitting device according to the invention in an early stage of assembly;

FIG. 4 is a schematic view of an optical subassembly for aligning an optical fiber with a light emitting device according to the invention in an intermediate stage of assembly;

FIG. 5 is a schematic view of an optical subassembly for aligning an optical fiber with a light emitting device according to the invention in a nearly complete stage of assembly; and FIG. 6 is a side elevational view in partial section of a presently preferred embodiment of an optical subassembly for aligning an optical fiber with a light emitting device according to the invention.

DETAILED DESCRIPTION

Turning now to FIGS. 1 and 2, the optical subassembly 10 for aligning an optical fiber 1 with a light emitting device 12 of the present invention includes a fiber optic stub 14 mounted in a ferrule 16 and a v-groove device 18 which is mounted onto the ferule at the position of the loose end of the fiber stub (loose end 20 of the fiber optic stub 14 lying in the v-groove device 18.) The other end 22 of the fiber optic stub 14 is polished.

According to the preferred embodiment of the invention, the ferrule 16 is mounted in a ring 24 which is welded 26 to a light emitting subassembly 28. The unpolished loose end 20 of the fiber optic stub 14 self-aligns with a mating fiber 1 in the v-groove device.

Referring now to FIGS. 3–5, the optical fiber stub 14 slightly longer than the ferrule 16 and is mounted in the ferrule 16 with an unpolished free end 20. The other end 22 of the fiber stub 14 is mounted flush with the ferrule 16 and is polished. The ferrule 16 is mounted in a ring 24.

The ring is aligned as shown in FIG. 4 so that the polished end 22 of the fiber stub 14 is aligned with the light source 12 in the light emitting subassembly 28. The ring and the sub assembly are then welded as illustrated schematically in FIGS. 4 and 5. The v-groove device 18 is then attached to the ferrule 16 as illustrated in FIG. 5.

FIG. 6 illustrates a presently preferred embodiment of an optical subassembly for aligning an optical fiber with a light emitting device 110 where similar features are indicated by similar reference numerals incremented by 100. According to this presently preferred embodiment, the v-groove device 118 is provided with s-bends 118a, 118b which aid in self-alignment between the loose fibers.

The optical subassembly for aligning an optical fiber with a light emitting device according to the invention is particularly useful in the assembly of SFF fiber optic connectors such as the 3M VF45 connector. The optical subassembly for aligning an optical fiber with a light emitting device according to the invention may be used with any light emitting device such as laser diode, LED, or a VCSEL laser.

There have been described and illustrated herein an optical subassembly for aligning an optical fiber with a light emitting device. While particular embodiments of the invention have been described, it is not intended that the invention be limited thereto, as it is intended that the invention be as broad in scope as the art will allow and that the specification be read likewise.

It will therefore be appreciated by those skilled in the art that yet other modifications could be made to the provided invention without deviating from its spirit and scope as so claimed.

What is claimed is:

1. An apparatus for aligning an optical fiber with a light emitting device, comprising:
   (a) a light emitting subassembly including a light emitting device;
   (b) a ferrule mounting ring welded to the light emitting subassembly;
   (c) a ferrule having a first end and a second end, said ferrule being mounted in said mounting ring;
   (d) a fiber optic stub having a first end and a second end, said fiber optic stub being longer than said ferrule, said fiber optic stub being mounted in said ferrule with its first end substantially flush with said first end of said ferrule, wherein said first end of said fiber optic stub is substantially aligned with the light source of said light emitting device; and
   (e) a v-groove device for receiving and self aligning the loose end of said fiber stub with the mating fiber of a connector; wherein said v-groove device has at least one s-bend.

2. The apparatus as set forth in claim 1, wherein said first end of said fiber optic stub is polished.

* * * * *

UNITED STATES PATENT AND TRADEMARK OFFICE
CERTIFICATE OF CORRECTION

PATENT NO.    : 6,682,231 B2
DATED         : January 27, 2004
INVENTOR(S)   : Stephan Meyer et al.

It is certified that error appears in the above-identified patent and that said Letters Patent is hereby corrected as shown below:

Title page,
Item [56], References Cited, OTHER PUBLICAITONS, replace "feber" with -- fiber --
Item [57], ABSTRACT, replace "ferule" with -- ferrule --

Signed and Sealed this

Fifteenth Day of June, 2004

JON W. DUDAS
*Acting Director of the United States Patent and Trademark Office*